United States Patent [19]

Kennedy

[11] Patent Number: 4,670,028
[45] Date of Patent: Jun. 2, 1987

[54] ABSORPTION-ABSORPTION-ABSORPTION VAPOR RECOVERY PROCESS

[75] Inventor: Paul E. Kennedy, Tulsa, Okla.

[73] Assignee: McGill Incorporated, Tulsa, Okla.

[21] Appl. No.: 751,329

[22] Filed: Jul. 1, 1985

[51] Int. Cl.⁴ ................... B01D 53/04; B01D 53/14
[52] U.S. Cl. ........................................ 55/48; 55/58; 55/62; 55/88; 55/179
[58] Field of Search ...................... 55/48–51, 55/55, 58, 62, 88, 179, 180, 208

[56] References Cited

U.S. PATENT DOCUMENTS

| | | | |
|---|---|---|---|
| 3,877,893 | 4/1975 | Sweny et al. | 55/48 |
| 4,066,423 | 1/1978 | McGill et al. | 55/48 |
| 4,261,716 | 4/1981 | Schwartz et al. | 55/179 X |
| 4,276,058 | 6/1981 | Dinsmore | 55/48 |
| 4,462,811 | 7/1984 | Dinsmore et al. | 55/88 X |

*Primary Examiner*—Charles Hart
*Attorney, Agent, or Firm*—Bill D. McCarthy

[57] ABSTRACT

A process for the recovery of hydrocarbon vapors from an air-hydrocarbon mixture expelled as a result of storage breathing or loading of a vented hydrocarbon vessel. An inlet air-hydrocarbon mixture is passed to a first absorber in which is fed a vacuum flashed liquid hydrocarbon absorbent to produce a first absorber overhead gas which is passed to a solid absorbent bed. Once saturated, the absorbed hydrocarbon on the solid absorbent is removed by vacuum regeneration, separated from liquid supplied by the liquid ring pump creating the vacuum, and passed to a second absorber vessel where fresh liquid hydrocarbon absorbent is contacted therewith to produce a second absorber overhead gas which is combined with the incoming inlet air-hydrocarbon mixture to pass therewith to the first absorber. Hydrocarbon free air is vented from the solid absorbent bed during the adsorption mode.

20 Claims, 1 Drawing Figure

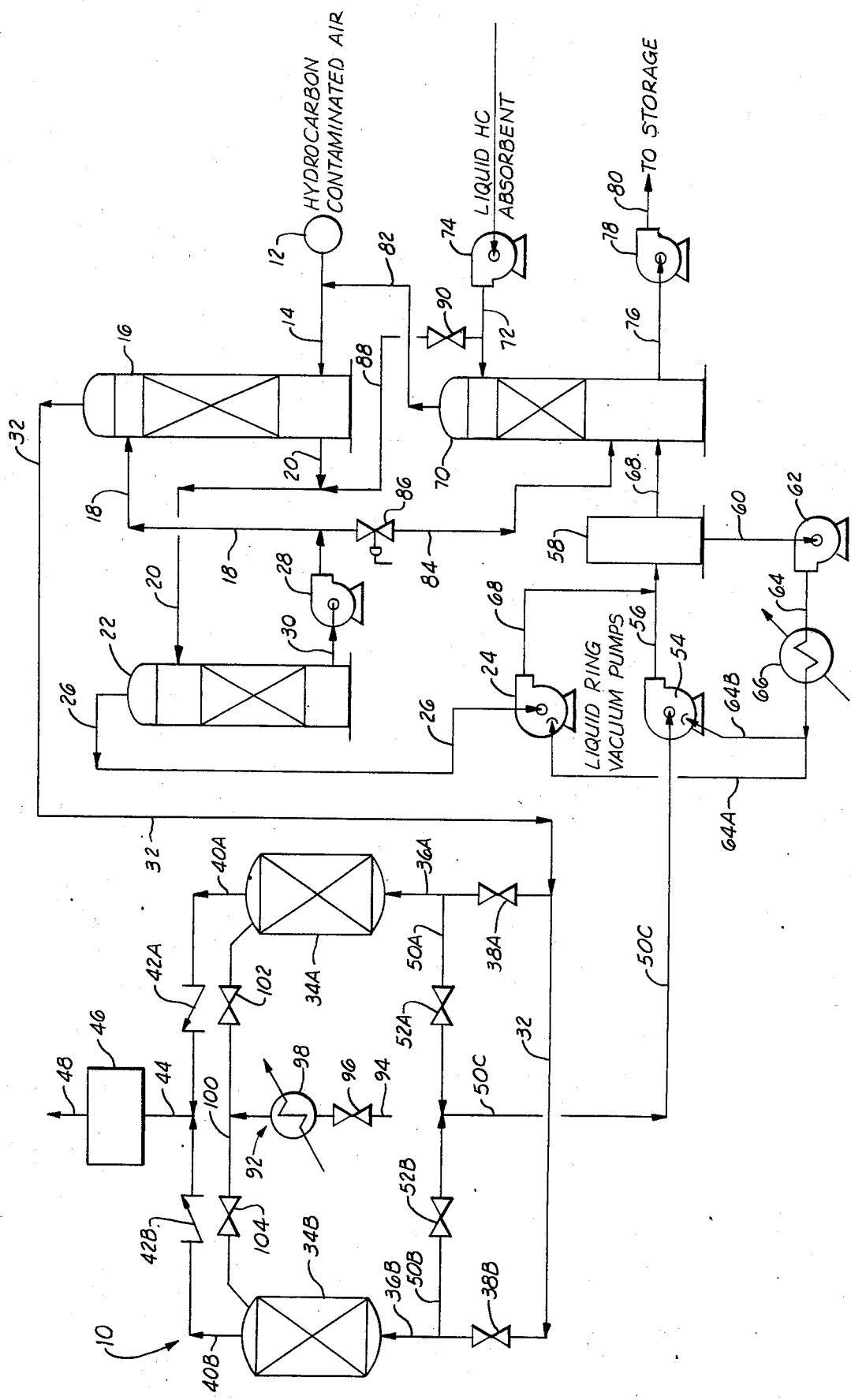

ABSORPTION-ABSORPTION-ABSORPTION VAPOR RECOVERY PROCESS

BACKGROUND OF THE INVENTION

1. Field of the Invention

The present invention relates generally to the field of hydrocarbon removal and recovery from air-hydrocarbon mixtures, and more particularly but not by way of limitation, to processes for the effective and economical removal of hydrocarbon components from mixtures of air-gasoline vapors.

2. Discussion of the Prior Art

The earliest known installation in the United States of a vapor recovery system for gasoline vapors was a unit which incorporated a process combining compression and condensation. This early vapor recovery system was installed in the late 1920's on a gasoline storage tank, and while several commercial entities marketed vapor compression systems for storage tanks in the years following that initial installation, it wasn't until the late 1950's that vapor recovery systems were installed at truck loading terminals in this Country to meet local air pollution regulations which severely limited levels of hydrocarbon emissions. These systems also practiced compression-condensation processes.

Nationally, "clean air" legislation activity began to garner serious attention in the 1960's, culminating in the Clean Air Act of 1968. This of course brought nationwide attention to gasoline vapor recovery and a marketing demand was immediately created to be filled by a host of manufacturers offering a variety of vapor recovery systems. With the exception of a lean oil/absorption system marketed by one such company, these systems were simply variations of the earlier compression-condensation units that were first installed for vapor recovery on storage tanks. The lean oil/absorption systems dominated the market until experience indicated that such units did not perform economically, even though theoretical design characteristics were favorable.

Cryogenic refrigeration systems began gaining market acceptance in the early 1970's as such vapor recovery units proved to be the more reliable of available systems. However, these units had high horsepower requirements, and required relatively high upkeep attention and expense. While meeting air pollution regulations of that era, the cryogenic units were, in general, not cost effective as such units represented an added cost of doing business.

An adsorption/absorption vapor recovery system was taught in U.S. Pat. No. 4,066,423 issued to McGill et al. in January, 1978. This system represented a very large reduction in operating costs over the cryogenic units, for example, requiring only about 10% of the connected horsepower of comparable cryogenic units. Further, the McGill et al. vapor recovery system represented cost savings as the value of the gasoline recovered by these units provided a respectable return on investment. Furthermore, these units have enjoyed a very favorable history of lower maintenance costs. Consequently, various adsorption/absorption systems generally filled the market requirements during the late 1970's as truck loading terminals installed mandated emission control systems.

The trend of governmental regulations, implementing the Clean Air Act of 1968 and related laws, has been toward ever stricter standards and stricter interpretation of existing ones. Meanwhile, developments in the petroleum industry have increased the amount of gasoline vapors which must be processed by the vapor recovery equipment at loading stations. This latter phenomonon has been brought about chiefly by the elimination of lead constituents in motor fuels, the consequent increase in aromatic makeup of such fuels, and the increase of gasoline vapor pressures.

Due to difficulties encountered with uniform interpretation of regulations requiring the reduction of hydrocarbon emissions as a percent of the discharge vapor load, there has developed a trend toward specifying the amount of permissible hydrocarbon emissions in absolute values, that is, the rating of permissible emission levels in terms of weight/volume loaded, usually in milligrams of hydrocarbon per liter of liquid product loaded (and often calculated as gasoline equivalent for heavy liquids such diesel products). As bottom truck loading became more prominent, with its accompanying leakage control difficulties, this approach to emission limitation was greatly resisted but has gained support as truck leakage has been greatly reduced. Currently, federal regulations require that total hydrocarbon emission be limited to less than 35 mg/liter in most parts of this country, and that trucks be periodically leak tested.

Of the vapor recovery systems presently in operation at truck loading sites in the United States, approximately 75 percent of same are either of the adsorption-/absorption type taught in the above mentioned McGill et al. patent or of the cryogenic refrigeration design. Most of these vapor recovery systems were installed sufficiently far back in time that they no longer are adequately sized for their service locations. As noted, the amounts of vapor loading have increased, both due to the changed gasoline makeup and the reduction of vapor bypassing due to truck leakage, and the permitted emission limits have stretched the service loading to the point of exceeding capability in many cases. As a consequence, many truck terminals, faced with large capital expenditures for updating facilities, have simply been closed or consolidated with other such loading stations.

These circumstances have intensified the need for more cost effective vapor recovery systems. More particularly, there has arisen the need for a means to increase the capacity of existing adsorption/absorption recovery systems of the type taught in the aforementioned McGill et al. patent since these units, or variations of same, comprise the majority of vapor recovery units that are serving truck loading stations in this Country.

While the situation above described has dealt with gasoline vapor recovery in the United States, similar circumstances can be found throughout the free world as global attention has paralleled the development of clean air controls in this Country. An international mandate for hydrocarbon emission abatement has developed rapidly over the last few years.

SUMMARY OF THE INVENTION

The present invention provides an improved process for the recovery of hydrocarbon components from air-hydrocarbon mixtures, and it is especially useful in the recovery of gasoline vapors expelled as a result of storage breathing or as a result of gasoline transfer to vented vessels, such as gasoline trucks.

In the preferred embodiment of practice, an inlet air-gasoline vapor mixture is passed through a first absorber and contacted with a vacuum flashed liquid gasoline absorbent to produce a first absorber overhead gas containing the nonabsorbed hydrocarbon components and air. While the bottom liquid of the first absorber is passed to a flash vessel for regenerating the vacuum flashed liquid gasoline absorbent, the first absorber is passed to a first solid adsorbent bed to adsorb the hydrocarbon-components and to vent substantially hydrocarbon free air to the atmosphere.

Upon saturation of the first solid adsorbent bed, a second solid adsorbent bed is placed on stream and the first solid adsorbent bed is vacuum regenerated with a liquid ring vacuum pump, whereupon a rich air-hydrocarbon mixture is produced. After separation of the vacuum pump water, the air-hydrocarbon stream from the adsorber is passed through a second absorber and contacted with fresh liquid gasoline absorbent from storage or the like in sufficiently high L/V ratio to produce a constant composition second absorber overhead gas which passes from the second absorber to be combined with the inlet air-gasoline vapor mixture stream passing to the first absorber. Absorber bottom liquid from the second absorber is passed to a selected destination, which is usually a gasoline storage tank.

An object of the present invention is to provide an improved vapor recovery system for the removal and recovery of hydrocarbons, such as gasoline, from an air-hydrocarbon mixture in order to discharge substantially hydrocarbon free air safely to the atmosphere in compliance with emission control regulations.

Another object of the present invention is to provide a more cost effective and efficient vapor recovery system of the type that incorporates the processes of solid bed adsorption and liquid hydrocarbon absorption.

Other objects, advantages and features of the present invention will become clear when the following description is read in conjunction with the accompanying drawing and appended claims.

BRIEF DESCRIPTION OF THE DRAWING

The FIGURE is a flow diagram showing the preferred embodiment to practice the present invention.

DESCRIPTION OF THE INVENTION

It is to be understood that the present invention is not limited in application to the details of construction and arrangement of components described below and illustrated in the accompanying Figure. Also, it should be understood that various details of construction, such as various valving, vessel internals and control mechanisms, are not included or described herein as these will be clearly understood to persons of ordinary skill in the art and are considered unnecessary for completeness of the disclosure herein provided.

"Breathing" of a vessel containing hydrocarbons, or loading same with hydrocarbons, results in the expulsion of an air-hydrocarbon vapor mixture to the atmosphere. This is discussed adequately in McGill et al. U.S. Pat. No. 4,066,423, so the mechanism of such need not be discussed further herein. With reference to the accompanying Figure, depicted schematically therein is a vapor recovery system 10 which is connected to a source 12 of hydrocarbon contaminated air, such as that expelled from a storage tank or transporting vessel, via a conduit or line 14 to the lower portion of a first absorber vessel 16. For purpose of simplifying the discussion, the hydrocarbon vapors will be assumed to be gasoline vapors, so then inlet line 14 feeds an air-gasoline vapor stream to the first absorber vessel 16. Furthermore, in order to more definitely distinguish the first absorber 16 from the second absorber described hereinbelow, the first absorber will sometimes be referred to as the "flashed hydrocarbon absorbent absorber" or the "flashed gasoline absorber".

A liquid hydrocarbon absorbent stream, also referred to and discussed more fully below as a flashed hydrocarbon absorbent or a flashed liquid gasoline absorbent, is fed to the top of the first absorber 16 via a line 18. The first absorber 16 is a conventional absorber operated near ambient temperature and slightly above atmospheric pressure and may be of either tray or packed tower design. In the first absorber 16, the inlet air-gasoline vapor mixture from line 14 is passed in direct countercurrent contact with the downwardly cascading flashed liquid gasoline absorbent introduced at the upper portion of the absorber via line 18 and the hydrocarbon components in the vapor are substantially absorbed. An enriched first absorber bottom liquid is withdrawn from the bottom of the first absorber 16 through line 20 and passed to a flash vessel 22.

Flash vessel 22 is a conventional vessel which is operated at subatmospheric pressure, preferably between about 1.0 psia and 5.0 psia, via a first liquid ring vacuum pump 24 which draws the flash vapor from the flash vessel 22 via a line 26. The flash vessel 22 thus serves to regenerate the enriched absorber bottom liquid received from the first absorber 16 by vacuum flashing same and producing a return stream of flashed absorbent which is pumped to the first absorber 16 via a pump 28 withdrawing the flashed liquid gasoline via line 30 and discharging same to line 18.

Returning to the first absorber 16, a first absorber overhead gas or vapor from the top thereof, comprising approximately 20 percent to 30 percent hydrocarbon by volume, passes by a line 32 to adsorbers described below. Thus, as discussed below, the composition of the first absorber overhead gas exiting the first absorber 16 via the line 32 is controlled to be generally constant in hydrocarbon content.

The vapor recovery system 10 further comprises a battery of parallel first and second adsorber vessels 34A and 34B, only one of which is on stream at a time to perform its adsorbing function. A line 36A connects line 32 to the bottom of the first adsorber vessel 34A, and line 36B connects line 32 to the bottom of the second adsorber vessel 34B. A valve 38A is located in line 36A between the first adsorber vessel 34A and the line 32, and a valve 38B is located in line 36B between the second adsorber 34B and the line 32. The adsorber vessels 34A, 34B are of conventional construction detail and contain beds of solid adsorbent material, typically activated carbon, capable of selectively adsorbing the hydrocarbon components from an air-hydrocarbon mixture.

A line 40A and a line 40B are connected to the upper ends of the first and second adsorber vessels 34A and 34B, respectively, and a pair of check valves 42A and 42B are provided in these lines respectively. The check valves 42A and 42B are connected to a line 44 which is connected to a flame arrestor 46. Vapor passing through the flame arrestor 46 is vented via line 48, normally to the atmosphere. A line 50A is connected to the line 36A between the valve 38A and the first adsorber vessel 34A, and a line 50B is connected to the line 36B between the valve 38B and the second adsorber vessel 34B. The lines 50A and 50B connect to line 50C. Valves 52A and 52B are disposed, respectively, in lines 50A and 50B. Line 50C is connected to the suction port of a second liquid ring vacuum pump 54. The pump discharge is connected to a line 56 which is connected to a water-hydrocarbon separator 58.

The first absorber overhead gas from the first absorber 16 is introduced at pressure slightly above atmospheric at about the temperature of the mixture source, which is normally about ambient, through line 32 to the lower portion of the first adsorber vessel 34A by opening the valve 38A and closing the valves 38B and 52A. As the air-hydrocarbon mixture flows through the solid adsorbent bed in the first adsorber vessel 34A, substantially all the hydrocarbon is adsorbed therefrom, and clean air is expelled from the top of the first adsorber through the line 40A and the check valve 42A. From the check valve 42A, the hydrocarbon free air passes through the line 44, through the flame arrestor 46, and therefrom to the atmosphere via line 48. The check valve 42B prevents effluent air from the first adsorber vessel 34A from entering the top of the second adsorber vessel 34B. Prior to reaching the saturation point of the adsorbent material in the first adsorber vessel 34A, the valves 38A and 52B are closed and the valve 38B is opened to route the air-hydrocarbon mixture from line 32 through line 36B to the second adsorber vessel 34B for use during the regeneration of the solid adsorbent material contained in the first adsorber vessel 34A.

The liquid ring vacuum pump 54 is capable of producing near absolute vacuum in either of the adsorber vessels 34A, 34B for regeneration. During regeneration of the first adsorber 34A, the valve 52A is opened, and the vacuum produced by the pump 54 desorbs hydrocarbon from the solid adsorbent bed material contained in the first adsorber vessel 34A to produce a rich air-hydrocarbon mixture. As this air-hydrocarbon mixture comes in direct contact with pumping liquid used by the second liquid ring vacuum pump 54, cooling of the air-hydrocarbon mixture will occur, and a portion of the heavier hydrocarbon components therein will condense. Effluent from the pump 54 is directed to the separator 58 via the line 56. The separator vessel 58 is operated slightly above atmospheric pressure and is designed to separate the vapor and liquid components of the pump effluent and to further separate the missible liquid used by the liquid ring pump from any recovered hydrocarbon liquid condensed by the inherent cooling action of the pump 54. The liquid components of the pump effluent are separated by means of a conventional weir (not shown) located in the bottom portion of the separator 58 over which the lighter hydrocarbon liquid flows. The heavier pumping liquid, typically water and antifreeze trapped by the weir, is withdrawn from the bottom of the separator 58 by a line 60 and pumped via pump 62 and line 64 through a cooler 66 back to the liquid side of the liquid ring vacuum pump 54. The cooler 66 is an indirect heat exchanger and may employ any suitable cooling medium.

Returning momentarily to the aforementioned flash vessel 22, the overhead flash vapor stream is drawn from the flash vessel 22 via line 26 to the first liquid ring vacuum pump 24. The effluent from the pump 24 is directed to the separator 58 via a line 68 which connects to line 56 from the second liquid ring vacuum pump 54. The same liquid serves both the first and second liquid ring vacuum pumps 24, 54 and the liquid withdrawn from the bottom of the separator vessel 58 is pumped by pump 62 through line 64 into lines 64A and 64B which are respectively connected to the pumps 24 and 54.

An air-hydrocarbon effluent stream exits the separator vessel 58 via a line 68 and passes to a second absorber vessel 70. Vapor received from the separator 58 via line 68 rises in direct countercurrent contact with a liquid absorbent introduced at the upper portion of the second absorber 70 via a line 72, and the hydrocarbon components in the vapor are substantially absorbed. The liquid absorbent fed to the second absorber via line 72 is fresh gasoline, or other appropriate fresh liquid hydrocarbon absorbent, pumped via a pump 74 through line 72; and the term "fresh" as used herein means that the gasoline or other liquid hydrocarbon absorbent is provided from a storage tank or other outside supply source of such liquid. A second absorber bottom liquid, which is recovered hydrocarbon liquid plus the fresh liquid gasoline absorbent fed to the top of the second absorber 70, is withdrawn from the bottom of the absorber 70 via a line 76 and a pump 78, and the withdrawn liquid is passed to storage or other needed point via a line 80. In order to distinguish the second absorber more clearly (from the first absorber 16), the second absorber 70 is also sometimes referred to as the "liquid hydrocarbon absorbent absorber" or the "gasoline absorber".

The second absorber 70 may be of either tray or packed tower design, and in like manner to that discussed above for the first absorber 16, is operated near ambient temperature and slightly above atmospheric pressure. The second absorber is preferably operated with a sufficiently high flow rate of liquid absorbent to feed gas ratio (L/V) to maintain a constant overhead vapor composition from the top of the absorber 70 regardless of the fluctuations in composition of the inlet feed rich air-hydrocarbon mixture in line 68.

The second absorber overhead vapor or gas exits the second absorber 70 via a line 82 which connects to the line 14 which is the inlet feed line to the first absorber 16. In this way the overhead vapor from the second absorber 70 is combined with the inlet air-gasoline vapors of line 14 and caused to pass therewith into the first absorber 16 before passing via line 32 to the solid adsorbent beds of the first or second adsorbers 34A, 34B.

Returning briefly to the flash vessel 22, it will be remembered from the above discussion that the lean flashed liquid gasoline absorbent is removed from the bottom of the flash vessel 22 via the pump 28. It may be necessary to bleed off an incremental part of the total volume, or system inventory, of this absorbent at some intervals, or at some predetermined rate, as required to maintain a constant quantity of system inventory, or just to assure the prevention of deleterious substance buildup. In practice, it is suggested that about 1 gallon per minute is usually sufficient for most commercial systems. This is achieved via a bleed line 84 which connects line 18 to the second absorber 70. A valve 86 is disposed in the line 84 to control the bleed off rate, both in quantity and timing. While the valve 86 can be a manual or an orifice controlled valve, it is preferable to provide a motor valve in the line 84 and to provide the flash vessel with a liquid level controller (not shown) to open and close valve 86 as necessary to maintain an appropriate amount of flashed liquid gasoline absorbent in the system. Makeup to the flashed liquid gasoline absorbent is achieved by a line 88 that connects the fresh gasoline line 72 to the line 20 that leads to the flash vessel 22. A valve 90, disposed in the line 88, is normally closed if a manual valve is used, or if experience of makeup absorbent so requires, the valve 90 can be cracked open to permit incremental makeup of the bleed off. Of course, an orifice valve or a motor valve can also be used in lieu of the valve 90 if conditions make such desirable. Also, the initial charge of absorbent to the system may be provided by opening the valve 90 to charge the system with an appropriate amount of gasoline to produce the system inventory of flashed absorbent. However, the initial inventory charge of absorbent liquid to the flash vessel 22 can be achieved with the use of any liquid having an affinity to absorb the hydrocarbon components in the hydrocarbon contaminated air of the inlet stream.

In operation, the solid adsorbent bed in the second adsorber vessel 34B will commence to become saturated with adsorbed hydrocarbons removed from the air-hydrocarbon mixture flowing through it during the same time that the solid adsorbent bed in the first adsorber vessel 34A is being regenerated. In practice, the regeneration of the first adsorber 34A will be completed in sufficient time to be placed on stream as the second adsorber is removed from service for vacuum regeneration. Preferably, the switch from the on stream to regeneration modes of the second adsorber 34B will occur prior to complete saturation. Valves 38B and 52A are closed and the valve 38A is opened to route the air-hydrocarbon mixture from line 32 through line 36A to the first adsorber vessel 34A for use during regeneration of the second adsorber 34B. Simultaneously, valve 52B is opened to connect the second adsorber 34B to line 50C which is connected to the suction port of the second liquid ring vacuum pump 54. As hydrocarbon free air is discharged from the second adsorber 34B the check valve 42B will open, and the check valve 42A will close, so that the exhausting air will exit via line 40B, line 44, flame arrestor 46 and line 48 to the atmosphere.

In practice, in addition to the above described details of the vapor recovery system 10 of the Figure, the first and second adsorber vessels 34A and 34B may be provided with an air inlet system 92 for admitting atmospheric air via a line 94, a valve 96, a heater 98, and a line 100 which connects to the top portions of the first and second adsorber vessels 34A, 34B. Valves 102 and 104 are disposed in line 100 as shown. This permits the selective admission of atmospheric air to the adsorber vessels as may be required for regeneration, and if desired, the air can be heated by the heater 98. For example, during a portion of the regeneration time of the first adsorber 34A, the valves 96 and 102 are opened, and the valve 102 is closed, providing a heated air stream to the solid adsorbent bed in the first adsorber vessel 34A. As is known, the admission of air, whether heated or at ambient temperature, is useful in removing the buildup of heavier hydrocarbons, often referred to as "heel", during a portion of the regeneration cycle.

The L/V mole ratio in the second absorber 70 maintained sufficiently high to achieve constant overhead gas composition is usually desirable, and in some applications may be important, as the only fluctuations to the first absorber 16 will be from that of the inlet air-hydrocarbon stream from the source 12. The on stream adsorber will thus see a more constant or controlled inlet condition as it relates to hydrocarbon composition, permitting the establishment of proper adsorption capacity availability regardless of inlet vapor fluctuations. In the present invention, the discharge vapor load of the second absorber 70, which services the regeneration pull off vapor of the adsorbers, is passed through the first absorber 16 after combining same with the inlet air-gasoline vapor stream and before it passes through the solid adsorbent beds. The first absorber 16 uses a lean flashed absorbent as it is constantly fed vacuum flashed gasoline from the flash vessel 22, leading to a reduction in the vapor hydrocarbon concentration prior to entry of the vapor into the solid adsorbent beds. This makes possible a very significant reduction in size of the solid adsorbent beds in the adsorbers 34A, 34B since the hydrocarbon concentration of the first absorber overhead gas is reduced even when the hydrocarbon concentration of the inlet air-gasoline stream in line 14 increases greatly. In fact, it is believed that the capacity of any vapor recovery system, including those employing adsorption, used in commercial recovery of gasoline vapors in truck loading service, can be increased by as much as 40 percent for new installations. With regard to existing vapor recovery installations, these systems can be increased in capacity a like amount by modifying those installations to practice the present inventive process.

With further regard to the novel use of an entry absorber 70 as taught by the present invention, it will be noted that this absorber operates with internally generated absorbent. The flashing that occurs in the flash vessel 22 will cool the absorbent by as much as 10 degrees F. to 30 degrees F. Thus, the generation of vacuum flashed gasoline absorbent also serves to cool the absorbent, providing the absorber 70 with a continuing source of cooled, lean liquid absorbent.

Additionally, the passage of the inlet air-gasoline vapors through the flashed gasoline absorber 70 upstream to the adsorbers provides another benefit in the capture of potentially deleterious constituents that may be in the inlet air-gasoline vapor stream. In the above described process for the removal of hydrocarbon components from an air-hydrocarbon mixture, heat of adsorption is generated during the adsorbing cycle. In most cases, the heat of adsorption does not result in appreciable heat build-up in the adsorbent bed for the reason that the exhausted hydrocarbon free air removes at least a portion of the heat generated, and the external surfaces of the adsorbent bed vessel serve to radiate a portion of the heat generated. However, heat build-up can be a problem in certain adsorption systems, especially during shut down. An example is activated carbon adsorption of ketones which sometimes are present in vapor recovery operations. If a carbon adsorption bed sets idle with ketones adsorbed on the carbon and with air in contact with the carbon and ketones, a slow oxidation can occur. The oxidation of ketones is an exothermic reaction. If this reaction occurs during the adsorption cycle, the heat generated by such oxidation will usually not be a factor in the operating conditions of the adsorbent bed, but if the oxidation reaction occurs during bed idlement as stated, the dissipation of the thermal energy generated by the exothermic reaction can become a problem. The reason for this is that carbon is a very good thermal insulating material, and the heat released by the oxidation reaction does not tend to be dissipated through the external walls of the vessel. Rather, local zones of high temperature can occur, causing the whole mass of the adsorbent bed to rise in temperature. As the temperature rises, the rate of oxidation increases and a type of boot-strap situation occurs in which the higher the temperature rises the greater is the rate of oxidation. Once commenced, the oxidation of the hydrocarbons on the carbon can drive the bed temperature to a level which can result in a carbon bed fire unless the temperature of the bed is controlled by a temperature limiting system.

While some prior art teachings have suggested the placement of cooling coils in carbon adsorbent beds, such cooling devices have functional capability only during circulation of a cooling medium and do not insure against temperature excursions during bed idlement with no power available to circulate the cooling medium. Experience has shown that the best approach to such undesirable temperature excursions is care in controlling the composition of inlet vapor streams to avoid the admission of harmful substances such as the aforementioned ketones. The present inventive process assists in this composition control by the removal of many such unwanted constituents by the first absorber 70 serving in effect as an initial filtering mechanism to protect the solid adsorbent beds from harmful intrusions.

It is clear that the present invention is well adapted to carry out the objects and to attain the ends and advantages mentioned as well as those inherent therein. While a presently preferred embodiment has been described for purposes of this disclosure, numerous changes may be made which will readily suggest themselves to those skilled in the art and which are encompassed within the spirit of the invention disclosed and as defined in the appended claims.

What is claimed is:

1. In a process in which hydrocarbon components are removed from an inlet air-hydrocarbon mixture by passing said inlet air-hydrocarbon mixture through solid adsorbent beds capable of selectively adsorbing hydrocarbon components from said inlet air-hydrocarbon mixture to exhaust substantially hydrocarbon free air, and in which said adsorbent beds are vacuum regenerated to produce a rich air hydrocarbon mixture which is passed to a liquid hydrocarbon absorbent absorber in which a substantial portion of the hydrocarbon components are absorbed from the rich air-hydrocarbon mixture with a liquid hydrocarbon absorbent to produce an absorber overhead gas containing nonabsorbed hydrocarbon components, the improvement comprising:
    (a) producing a flashed absorbent stream by flashing an effective amount of a liquid having an affinity to absorb hydrocarbon components from the inlet air-hydrocarbon mixture;
    (b) mixing the absorber overhead gas from the liquid hydrocarbon absorbent absorber with the inlet air-hydrocarbon mixture;
    (c) passing the combined absorber overhead gas and inlet air-hydrocarbon mixture from step (b) in absorption relationship with the flashed absorbent stream in a flashed hydrocarbon absorbent absorber to produce another absorber overhead gas and to produce an enriched absorber bottom liquid; and
    (d) passing said other absorber overhead gas from step (c) to the solid adsorbent beds for adsorbing substantially all of the hydrocarbon components in the other absorber overhead gas.

2. The improvement of claim 1 further comprising:
    passing the enriched absorber bottom liquid from the flashed hydrocarbon absorbent absorber to a flash vessel to regenerate the flashed absorbent stream and to produce an overhead flash vapor stream; returning the regenerated flashed absorbent stream to the flashed hydrocarbon absorbent absorber; and
    passing the flash vapor stream from the flash vessel to the liquid hydrocarbon absorbent absorber which receives the rich air-hydrocarbon mixture from the adsorbent beds.

3. The improvement of claim 2 further comprising:
    bleeding an incremental part of the flashed absorbent stream at a predetermined rate.

4. The improvement of claim 3 further comprising:
    making up the flashed absorbent stream with an amount of the liquid hydrocarbon absorbent as required to maintain a desired system inventory of same.

5. The improvement of claim 2 wherein a subatmospheric pressure of between about 1.0 to about 5.0 psia is maintained in the flash vessel by a liquid ring vacuum pump.

6. The improvement of claim 2 wherein the air-hydrocarbon mixture comprises air-gasoline vapors and wherein the liquid hydrocarbon absorbent is gasoline.

7. The improvement of claim 3 wherein the air-hydrocarbon mixture comprises air-gasoline vapors and wherein the liquid hydrocarbon absorbent is gasoline.

8. The improvement of claim 4 wherein the air-hydrocarbon mixture comprises air-gasoline vapors and wherein the liquid hydrocarbon absorbent is gasoline.

9. The improvement of claim 5 wherein the air-hydrocarbon mixture comprises air-gasoline vapors and wherein the liquid hydrocarbon absorbent is gasoline.

10. A process for recovering hydrocarbon components from an air-hydrocarbon mixture, comprising:
    (a) flashing a liquid hydrocarbon in a flash vessel which is at subatmospheric pressure to produce a flashed hydrocarbon absorbent;
    (b) absorbing a portion of the hydrocarbon components from the inlet air-hydrocarbon mixture with the flashed hydrocarbon absorbent in a first absorber to produce a first absorber overhead gas stream containing hydrocarbon components and air, and producing a first absorber bottom liquid;
    (c) passing the first absorber overhead gas through a solid adsorbent bed capable of selectively adsorbing the hydrocarbon components therefrom so as to leave substantially hydrocarbon free air;
    (d) venting the substantially hydrocarbon free air to the atmosphere;
    (e) subjecting the hydrocarbon laden solid adsorbent bed to a vacuum with a liquid ring vacuum pump to desorb the adsorbed hydrocarbon components therefrom so as to produce a rich air-hydrocarbon mixture comprising recovered liquid hydrocarbon and liquid from the liquid ring vacuum pump;
    (f) separating the liquid from the liquid ring vacuum pump in the rich air-hydrocarbon mixture from the solid adsorbent bed;
    (g) absorbing substantially all of the hydrocarbon components from the rich air-hydrocarbon mixture with a liquid hydrocarbon absorbent in a second absorber to produce a second absorber overhead gas stream and a recovered liquid hydrocarbon mixed with said liquid hydrocarbon absorbent;
    (h) combining the second absorber overhead gas stream with the inlet air-hydrocarbon mixture prior to passing same to the first absorber for the absorption step (b) above;
    (i) passing the first absorber overhead gas from the absorption step (b) above to a second solid adsorbent bed capable of selectively adsorbing the hydrocarbon components therein to leave substantially hydrocarbon free air;
(j) venting the substantially hydrocarbon free air of step (i) to the atmosphere;
(k) cooling the liquid ring vacuum pump liquid; and
(l) recycling said liquid ring vacuum pump liquid for use in the liquid ring vacuum pump.

11. The process of claim 10 further comprising:
removing a portion of the flashed hydrocarbon absorbent stream at a predetermined rate; and
making up said flashed hydrocarbon absorbent with the liquid hydrocarbon as required to maintain the desired system inventory of same.

12. The process of claim 11 wherein the first absorber is maintained at slightly above atmospheric pressure.

13. The process of claim 12 wherein the flash vessel is maintained at a vacuum of about 1.0 to about 5.0 psia.

14. The process of claim 11 wherein the air-hydrocarbon mixture comprises air-gasoline vapors and wherein the liquid hydrocarbon absorbent used in the second absorber is gasoline.

15. The process of claim 14 wherein the liquid hydrocarbon used in the flash vessel for producing the flashed hydrocarbon absorbent is gasoline.

16. A process for removing and recovering gasoline vapors from an air-gasoline vapor mixture, comprising:
(a) passing an inlet stream of air-gasoline vapors through a first absorber in liquid-vapor absorption relationship with vacuum flashed liquid gasoline absorbent to produce a first absorber overhead gas containing nonabsorbed hydrocarbon vapors and air, and to produce a first absorber bottom liquid containing recovered hydrocarbon components of the gasoline vapors of the inlet stream of air-gasoline vapors;
(b) passing the first absorber overhead gas to a first solid adsorbent bed capable of selectively adsorbing the nonabsorbed hydrocarbon vapors and to leave substantially hydrocarbon free air;
(c) passing the first absorber bottom liquid to a flash vessel maintained at subatmospheric pressure to produce an overhead flash vapor and to regenerate the flashed liquid gasoline absorbent;
(d) venting the substantially hydrocarbon free air from the first solid adsorbent bed to the atmosphere;
(e) passing the first absorber overhead gas to a second solid adsorbent bed of similar capability to the first solid adsorbent bed when said first solid adsorbent bed becomes sufficiently hydrocarbon laden;
(f) subjecting the hydrocarbon laden first solid adsorbent bed to a vacuum with a liquid ring vacuum pump to desorb the hydrocarbon components therefrom so as to produce a rich air-hydrocarbon mixture comprising recovered hydrocarbon and liquid from the liquid ring vacuum pump;
(g) separating the liquid from the liquid ring vacuum pump from the rich air-hydrocarbon mixture from the first solid adsorbent bed in a separator to produce an air-hydrocarbon effluent stream;
(h) cooling the separated liquid ring vacuum pump liquid and recycling same to the liquid ring vacuum pump;
(i) passing the air-hydrocarbon effluent stream from the separator and the overhead flash vapor from the flash vessel through a second absorber in absorption relationship with fresh liquid gasoline absorbent from a selected source of same in a sufficiently high L/V ratio to produce a constant composition second absorber overhead gas containing nonabsorbed hydrocarbon vapors and air, and to produce a second absorber bottom liquid;
(j) passing the second absorber bottom liquid to a selected destination;
(k) passing the second absorber overhead gas to the first absorber to pass therethrough in combination with the inlet stream of air-gasoline vapors of step (a) above; and
(l) passing the first absorber overhead gas to the first adsorbent bed when the second solid absorbent bed becomes sufficiently hydrocarbon laden and repeating the above steps alternatingly using the first and second adsorbent beds in an on stream adsorbing mode and in a vacuum regenerating mode.

17. The process of claim 16 further comprising:
(m) bleeding a portion of the flashed liquid gasoline absorbent stream at a predetermined rate; and
(n) making up the system inventory of flashed liquid gasoline absorbent stream with fresh liquid gasoline as required.

18. The process of claim 17 wherein the bleeding portion of flashed liquid gasoline absorbent stream is passed to the second absorber vessel and combined with the second absorber bottom liquid for removal to the selected destination.

19. The process of claim 18 wherein the first and second absorber vessels are maintained at slightly above atmospheric pressure.

20. The process of claim 19 wherein the flash vessel is maintained at a vacuum of about 1.0 to about 5.0 psia.

* * * * *

UNITED STATES PATENT AND TRADEMARK OFFICE
CERTIFICATE OF CORRECTION

PATENT NO. : 4,670,028

DATED : June 2, 1987

INVENTOR(S) : Paul E. Kennedy

It is certified that error appears in the above-identified patent and that said Letters Patent is hereby corrected as shown below:

The heading [54], the title "ABSORPTION-ABSORPTION-ABSORPTION VAPOR RECOVERY PROCESS" should read --ABSORPTION--ADSORPTION-ABSORPTION VAPOR RECOVERY PROCESS. The heading [57], line 8 of the ABSTRACT, the word "absorbed" should read --adsorbed--; the heading [57], line 8 of the ABSTRACT, the word "absorbent" should read --adsorbent--. The heading [57], line 16 of the ABSTRACT, the word "absorbent" should read --adsorbent--. In column 2, line 17, the word "products" should read --product--.

Signed and Sealed this

Tenth Day of May, 1988

Attest:

DONALD J. QUIGG

*Attesting Officer*  *Commissioner of Patents and Trademarks*